L. E. BEAULIEU.
FISH PLATE BOLT.
APPLICATION FILED MAY 29, 1911.
1,023,985.
Patented Apr. 23, 1912.
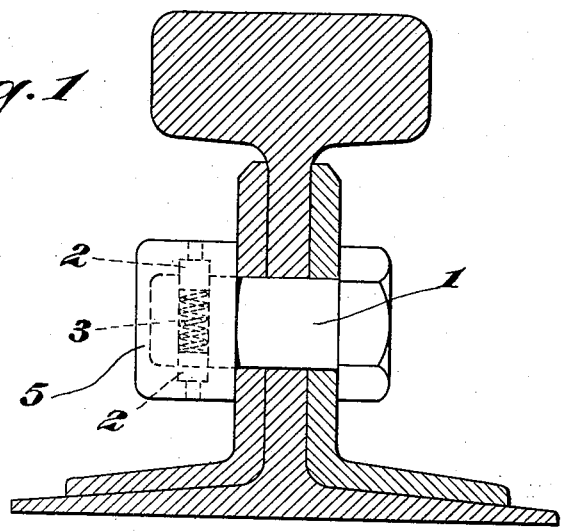
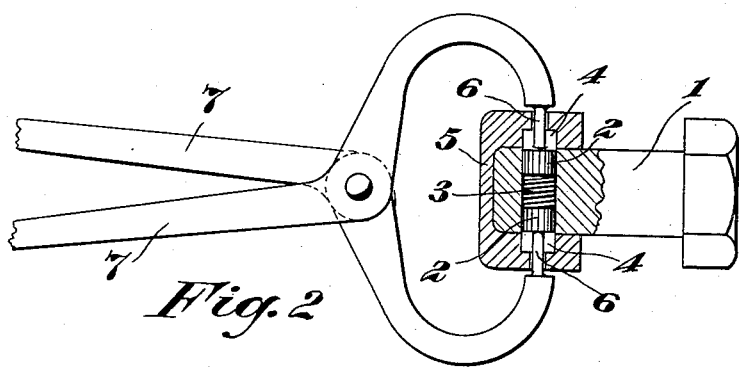
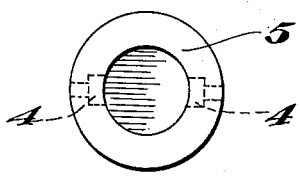
LOUIS EMILE BEAULIEU
Inventor
Witnesses:
By
Attorneys

UNITED STATES PATENT OFFICE.

LOUIS EMILE BEAULIEU, OF SOREL, QUEBEC, CANADA.

FISH-PLATE BOLT.

1,023,985.     Specification of Letters Patent.     Patented Apr. 23, 1912.

Application filed May 29, 1911. Serial No. 630,003.

*To all whom it may concern:*

Be it known that I, LOUIS EMILE BEAULIEU, a subject of the King of England, residing at Sorel, in the Province of Quebec, Canada, have invented certain new and useful Improvements in Fish-Plate Bolts; and I do hereby declare that the following is a full, clear, and exact description of the invention, such as will enable others skilled in the art to which it appertains to make and use the same.

The invention to be hereinafter described relates to fish plate bolts and more particularly to a nut lock therefor.

In order to more clearly disclose the construction, operation, and use of the invention, reference should be had to the accompanying drawings forming part of the present application.

In the drawings: Figure 1 is a side elevation of the invention, as applied to fish plates and the web of a rail; Fig. 2 is a central, vertical, longitudinal, cross section through the nut end of the device, showing the method of removing the nut; Fig. 3 is a rear end elevation of the nut, removed; and Fig. 4 is a perspective view of one of the small locking locks, removed.

The main objects of the invention are to provide a simple, durable, economical, and efficient nut lock for fish plate bolts, and one which may be easily and quickly applied and removed.

Referring to the drawings in detail, 1 indicates a bolt provided with a small bore extending laterally through it near one end. Slidably seated in the opposite ends of this bore are two small cylindrical locking blocks 2 which are forced apart and slightly beyond the surface of the bolt by means of a coil spring 3 interposed between their adjacent ends. The outer ends of these blocks are adapted to be seated in coöperating sockets 4 formed in the walls of a cap nut 5 adapted to be slid over the end of the bolt 1. As the cap nut reaches its inward limit, the spring 3 will force the blocks into their notches and the nut will be positively and securely locked against accidental removal. In order to render removal possible, very small bores or holes are provided in the walls of the nut and leading into the sockets 4. Through these may be inserted the pins 6 of the arms of a pair of pliers 7. By closing the pliers, the pins 6 will engage blocks 2 and force them inwardly to inoperative position—see Fig. 2. Then the nut may be slid off with ease. The same pliers, or other means, may be used to hold the blocks inoperative as the nut is slid on, or to operative position.

It is thought that the operation and use of the invention will be clear from the preceding detailed description.

Changes may be made in the construction, arrangement, and disposition of the several parts of the invention without in any way departing from the field and scope of the same and it is meant to include all such within this application wherein only a preferred form has been disclosed.

Having thus fully described my invention, what I claim as new and desire to secure by Letters Patent is:

1. A bolt provided with a lateral bore extending through it to both of its sides and a cap provided with sockets registering with said lateral bore, in combination with two blocks arranged to slide in opposite directions in said lateral bore and to enter said sockets, and a spring arranged between said blocks to force the same apart and into said sockets, the said cap being adapted to permit the insertion from outside of means for forcing back said block within said bore to permit the separation of said bolt from said cap.

2. A threadless bolt provided with a lateral bore and a cap provided with sockets registering with said lateral bore and provided further with bores extending through its side walls and into said sockets, but of smaller diameter than the latter, in combination with two blocks arranged in opposite directions in said lateral bore and to enter said sockets and a spring arranged between said blocks and in direct engagement therewith to force the same apart and into said sockets.

3. A bolt provided near its end with a transverse bore, in combination with a spring in the middle part of said bore, two sliding parts in the ends of said bore forced outward by said spring in opposite directions and a cap fitting on the end of said bolt and having two lateral sockets registering with said bore to receive the said parts when thus forced outward.

In witness whereof I have hereunto set my hand in the presence of two witnesses.

LOUIS EMILE BEAULIEU.

Witnesses:
L. A. GAUVIN,
E. J. GAUVIN.

Copies of this patent may be obtained for five cents each, by addressing the "Commissioner of Patents. Washington, D. C."